United States Patent
Hudin et al.

(10) Patent No.: US 12,026,312 B2
(45) Date of Patent: Jul. 2, 2024

(54) TACTILE STIMULATION INTERFACE USING TIME REVERSAL AND PROVIDING ENHANCED SENSATIONS

(71) Applicant: COMMISSARIAT A L'ENERGIE ATOMIQUE ET AUX ENERGIES ALTERNATIVES, Paris (FR)

(72) Inventors: Charles Hudin, Paris (FR); Christian Bolzmacher, Montrouge (FR); Moustapha Hafez, Arcueil (FR); Harald Zophoniasson, Les Ulis (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/607,307

(22) PCT Filed: Apr. 23, 2018

(86) PCT No.: PCT/FR2018/051011
§ 371 (c)(1),
(2) Date: Oct. 22, 2019

(87) PCT Pub. No.: WO2018/197793
PCT Pub. Date: Nov. 1, 2018

(65) Prior Publication Data
US 2020/0379563 A1 Dec. 3, 2020

(30) Foreign Application Priority Data
Apr. 24, 2017 (FR) ...................................... 17 53537

(51) Int. Cl.
*G06F 3/01* (2006.01)
*G06F 3/041* (2006.01)

(52) U.S. Cl.
CPC .......... *G06F 3/016* (2013.01); *G06F 3/04142* (2019.05)

(58) Field of Classification Search
CPC ....................................................... G06F 3/016
See application file for complete search history.

(56) References Cited

U.S. PATENT DOCUMENTS

| 2008/0024459 A1 | 1/2008 | Poupyrev et al. |
| 2009/0051667 A1* | 2/2009 | Park ...................... G06F 3/0414 345/173 |

(Continued)

FOREIGN PATENT DOCUMENTS

WO  WO 2013/182611 A1  12/2013

OTHER PUBLICATIONS

International Search Report issued Sep. 27, 2018 in PCT/FR2018/051011 filed on Apr. 23, 2018.

(Continued)

*Primary Examiner* — Nan-Ying Yang
(74) *Attorney, Agent, or Firm* — Oblon, McClelland, Maier & Neustadt, L.L.P.

(57) ABSTRACT

A tactile stimulation interface includes a surface which the user explores by touch with the fingers, an actuator for applying a force to the surface, and a controller for controlling the actuator. The controller sends the actuator signals corresponding to the forces to be applied to the surface according to the tactile stimulation to be generated on the surface, the forces being determined by a time reversal method. The controller is configured such that, for at least one given tactile pattern, the actuator is controlled such as to generate pulses, in at least one area of the surface, by focusing at least one acoustic wave at a point. The location (Continued)

of the point on the surface varies over time, such as to provide tactile stimulation for the finger according to the given tactile pattern.

18 Claims, 4 Drawing Sheets

(56) References Cited

U.S. PATENT DOCUMENTS

| | | |
|---|---|---|
| 2011/0141052 A1 | 6/2011 | Bernstein et al. |
| 2011/0216006 A1* | 9/2011 | Litschel ............... G09B 21/003 345/168 |
| 2012/0123268 A1* | 5/2012 | Tanaka ................. B06B 1/0292 600/443 |
| 2012/0268412 A1* | 10/2012 | Cruz-Hernandez .......................... G06F 3/0488 340/407.1 |
| 2012/0326999 A1* | 12/2012 | Colgate ................. G06F 3/016 345/173 |
| 2013/0215079 A1* | 8/2013 | Johnson ................ G06F 3/016 345/174 |
| 2014/0009441 A1 | 1/2014 | Bernstein et al. |
| 2014/0092064 A1 | 4/2014 | Bernstein et al. |
| 2015/0160773 A1 | 6/2015 | Bernstein et al. |
| 2015/0169060 A1* | 6/2015 | Hudin .................... G06F 3/016 345/173 |
| 2015/0293631 A1 | 10/2015 | Bernstein et al. |
| 2016/0188103 A1 | 6/2016 | Bernstein et al. |
| 2016/0246374 A1 | 8/2016 | Carter et al. |
| 2017/0075424 A1 | 3/2017 | Bernstein et al. |
| 2018/0101234 A1 | 4/2018 | Carter et al. |
| 2018/0129287 A1 | 5/2018 | Bernstein et al. |

OTHER PUBLICATIONS

French Preliminary Search Report issued Oct. 31, 2017 in French Application 1753537 filed on Apr. 24, 2017.
Hudin, C. et al., "Localized Tactile Feedback on a Transparent Surface through Time-Reversal Wave Focusing," IEEE Transactions on Haptics, vol. 8, No. 2, Apr.-Jun. 2015, pp. 188-198.
Bekesy, G. v., "Similarities Between Hearing and Skin Sensations," The Psychological Review, vol. 66, No. 1, Jan. 1959, pp. 1-22.

* cited by examiner

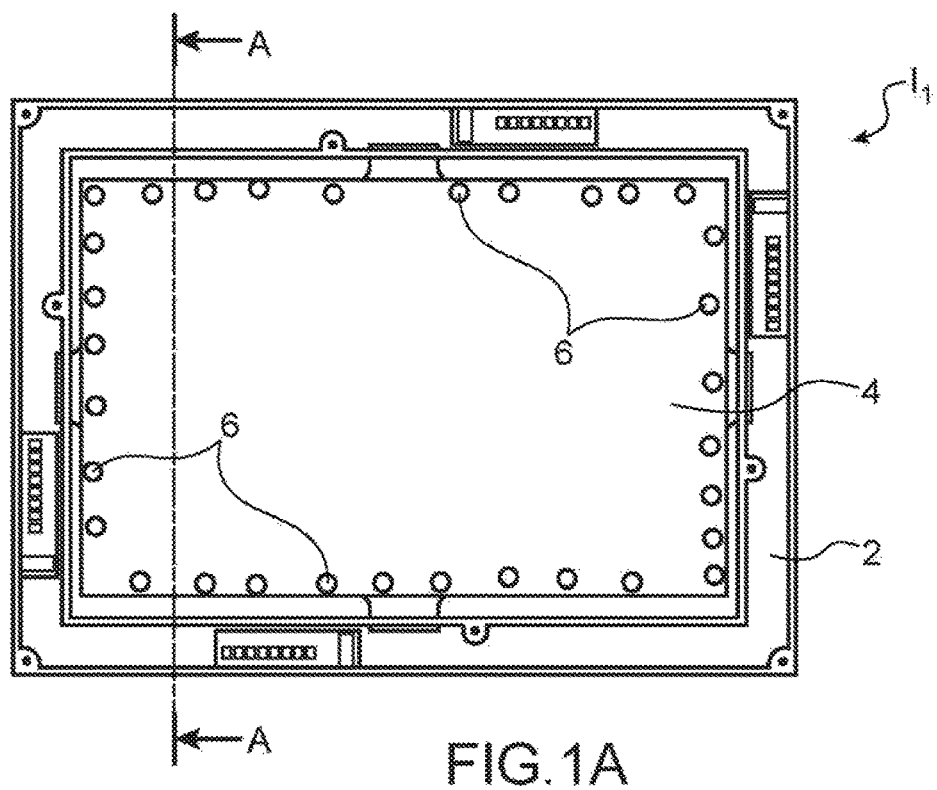
FIG.1A
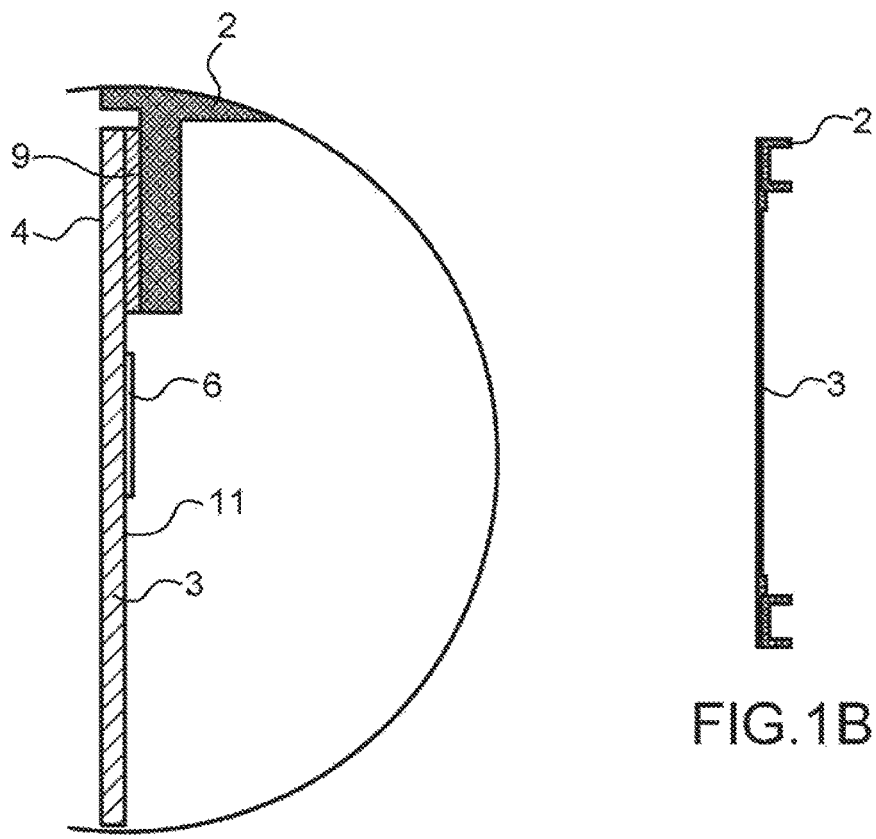
FIG.1C
FIG.1B

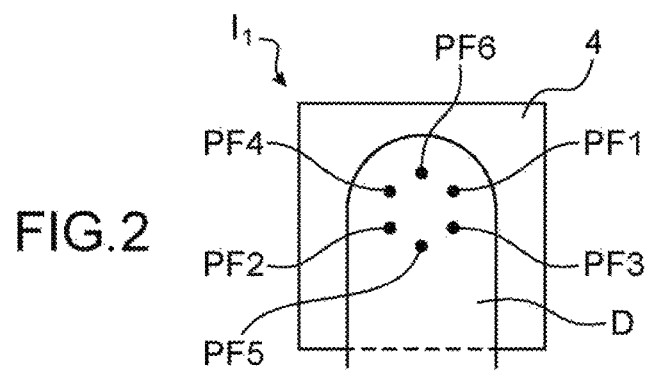
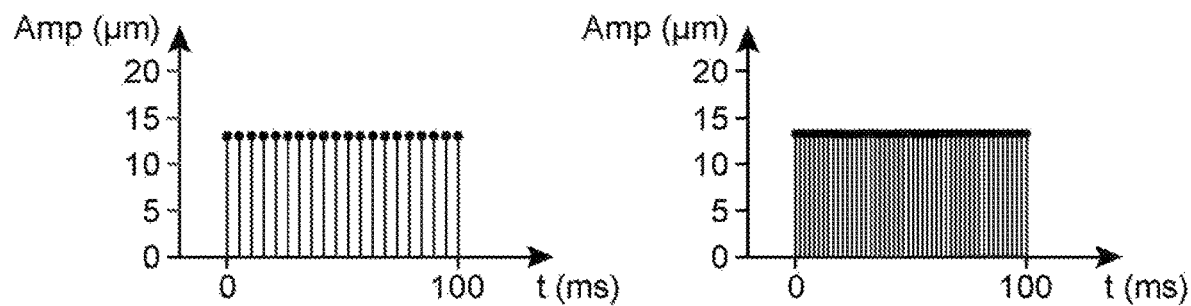
FIG.3A FIG.3B
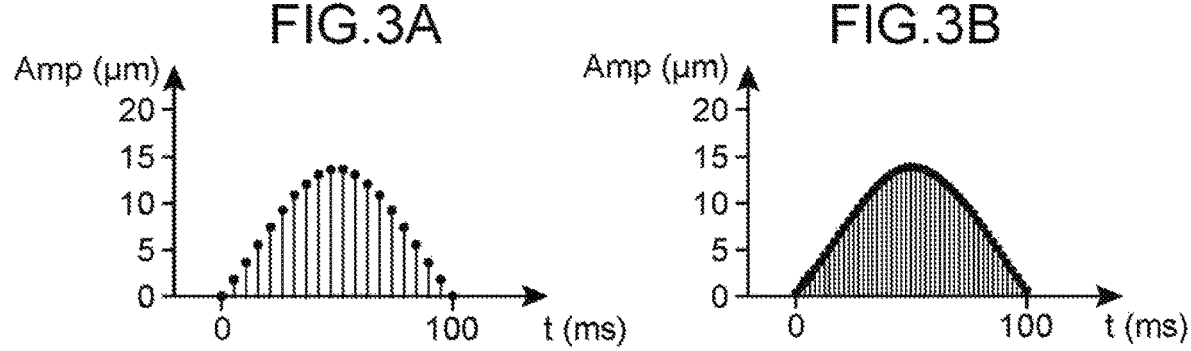
FIG.3C FIG.3D
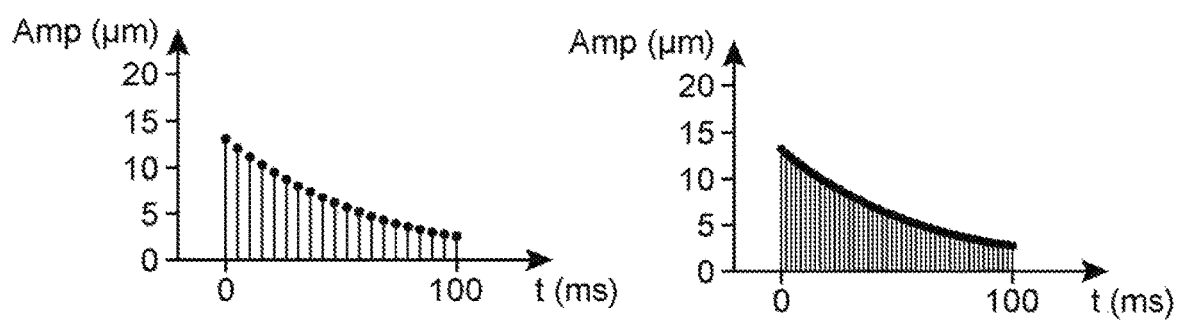
FIG.3E FIG.3F

TACTILE STIMULATION INTERFACE USING TIME REVERSAL AND PROVIDING ENHANCED SENSATIONS

TECHNICAL FIELD AND STATE OF PRIOR ART

The present invention relates to a tactile stimulation interface using time reversal and providing enhanced sensations and to a method for controlling such an interface.

A tactile stimulation interface is intended to reproduce a tactile piece of information, such as a texture, a relief, a time and/or space variable roughness, an illusion of pressing on a flexible material, of pressing a key.

Such interfaces are used for example in the field of human-machine interfaces. They can also be used in the fields of optics, acoustics, chemistry, and automated manufacturing . . . .

Some interfaces use a network of actuators, for example piezoelectric or electrostatic actuators, disposed under the surface in the areas where the fingers are intended to come into contact. When one of the actuators is activated, the whole surface is vibrated, and the user touching the surface with several fingers, feels the same stimulation on all his/her fingers.

There are tactile interfaces using the time reversal method, for example described in document C. Hudin, J. Lozada, et V. Hayward, "*Localized Tactile Feedback on a Transparent Surface through Time-Reversal Wave Focusing*", IEEE Transactions on Haptics, vol. 8, no 2, p. 188 198, apr. 2015. The interface includes a glass plate and actuators disposed in contact with and at the periphery of the glass plate. The piezoelectric actuators propagate acoustic waves in the glass plate. The advantage of the implementation of a time reversal method is to enable a vibration to be generated in a localised way on the surface of the plate and enables the different fingers to be separately stimulated, this tactile feedback is also referred to as "multitouch localised tactile feedback".

This document suggests repeating the time reversal focusing method in order to form a movement pulse train of the surface in order to provide an intensified stimulation.

The aim is to further enhance the sensations felt by the user.

DISCLOSURE OF THE INVENTION

A purpose of the present invention is consequently to provide a tactile stimulation interface enabling different stimulations to be generated at different locations of the interface and providing enhanced sensations.

The above-stated purpose is reached by a tactile stimulation interface implementing a time reversal method, said interface including a surface intended to be tactilely explored by a user and at least one actuator intended to apply a strain to the surface, means for controlling said actuator, said control means determining the strain by the time reversal method. The control means send control signals to said actuator so that, in order to generate a same stimulation, the at least one actuator generates pulses by focusing acoustic waves at a point whose location at the surface varies over time. The different locations of the pulses are located in the area for example covered with the pad of the finger in contact with the surface.

In other words, the control means control the actuator so as to at least spatially modulate the location of the focusing point to generate the same haptic pattern, which enables a wide range of tactile sensations to be reproduced.

Indeed, the inventors have noticed that the perceived dimension of the focusing point by the user was in the order of 1 mm to 2 mm, lower than the real size of the focusing spot which is in the order of 5 mm. They have then determined that by moving the focusing point over time to generate the same stimulation, the spatial dimension perceived by the user was more significant, which allowed a richer vibrotactile feedback than by the repeated focusing at the same point of the surface. Stimulation is for example clicks of variable perceived shapes and amplitudes, a certain stiffness to reproduce the pressing of a button, a texture . . . .

This spatial modulation of the focusing point is made possible thanks to the good spatial resolution of the time reversal method.

For example, moving the pulse point occurs under the contact area, for example under the pad of the finger which explores the surface. For example, the distance between two focusing points is between 100 µm and 1 mm.

By making a quicker movement of the point, a larger object than the size of a point can be simulated.

Preferably, a learning step enables the setting up of a database of the reversed pulse responses at a certain number of points of the surface for example distributed as a grid, and the pulse responses between the points of the database are determined by spatial interpolation.

Very advantageously, focusing can be repeated over time and time- and/or amplitude-modulated.

Furthermore, the strain for example applied by the finger(s) and/or their position can be taken into account for the spatial and advantageously time modulation of the focusing.

For example the surface is carried by a glass plate.

Preferably the actuators, for example piezoelectric actuators, are in contact with the outer edge of the glass plate. The surface can then be transparent and can be that of a touch screen.

The subject-matter of the present invention is then a tactile stimulation interface including a surface intended to be tactilely explored by at least one user's organ, at least one actuator intended to apply a strain to said surface, and means for controlling said at least one actuator, said control means being intended to send to the actuator signals corresponding to the strains to be applied to said surface as a function of the tactile stimulation to be generated on the surface, said strains being determined by a time reversal method. The control means are such that, for at least one given tactile pattern, said at least one actuator is controlled so as to generate in at least one area of said surface, pulses by focusing at least one acoustic wave at a point whose location at the surface varies over time, so as to tactilely stimulate said organ according to the given tactile pattern.

Advantageously, the control means are able to control said at least one actuator so that it generates in several distinct areas pulses by focusing acoustic waves at a point whose location at the surface varies over time, so as to tactilely stimulate several organs according to given tactile patterns.

The tactile stimulation interface can advantageously include means for detecting the presence of said at least one organ intended to be tactilely stimulated, the detecting means being for example of the capacitive type, and/or means for detecting the contact force between the at least one organ intended to be tactilely stimulated and the surface.

The tactile stimulation interface can include several actuators.

In an exemplary embodiment, the surface is carried by a plate, the actuator(s) being located in contact with the plate at at least an edge thereof. Advantageously the plate is transparent.

Another subject-matter of the present invention is a method for controlling a tactile stimulation interface according to the invention, so as to tactilely stimulate at least one organ according to a given tactile pattern in at least one first area of the surface, including a spatial modulation of at least one focusing point of at least one acoustic wave generated by said at least one actuator.

The method can include the steps of:
a) determining a reversed pulse response for a first point of said area,
b) convoluting said reversed pulse response to said given tactile pattern,
c) generating a signal based on the result of said convolution and sending said signal to said at least one actuator and generating pulses to said first point,
d) repeating steps a), b) and c) for n other points of said area, n being an integer equal to or greater than 1, at least one point of the n points being distinct from the first point.

Steps a), b), c) and d) can be simultaneously performed for the first area and for a second area distinct from the first area, and during step c) the signal sent to said actuator is the sum of the signal generated for the first area and of the signal generated for the second area.

Advantageously, the force exerted by the organ on the surface is measured and is taken into account in generating the signal.

According to a feature of the invention, the pattern can have a variable amplitude and/or a variable pulse generation frequency.

In an exemplary embodiment, during step a), the reversed pulse response is chosen from a database.

In another exemplary embodiment, during step a), the reversed pulse response is determined by interpolation between at least two reversed pulse responses chosen from a database.

Advantageously, the presence of the organ intended to be tactilely stimulated is detected prior to step a).

BRIEF DESCRIPTION OF THE DRAWINGS

The present invention will be better understood based on the following description and of the appended drawings in which:

FIG. 1A is a top view of an exemplary embodiment of a tactile stimulation interface, FIG. 1B is a cross-sectional view of FIG. 1A along the plane A-A, FIG. 1C is a detailed view of FIG. 1B at an actuator, FIG. 2 is a schematic description of the successive focusing points that can be excited by a tactile interface according to the invention, FIGS. 3A-3F are schematic descriptions of examples of the time modulation of the amplitude of the movement in μm at the focusing point as a function of time in ms at different frequencies.

DETAILED DISCLOSURE OF PARTICULAR EMBODIMENTS

Figure 4:
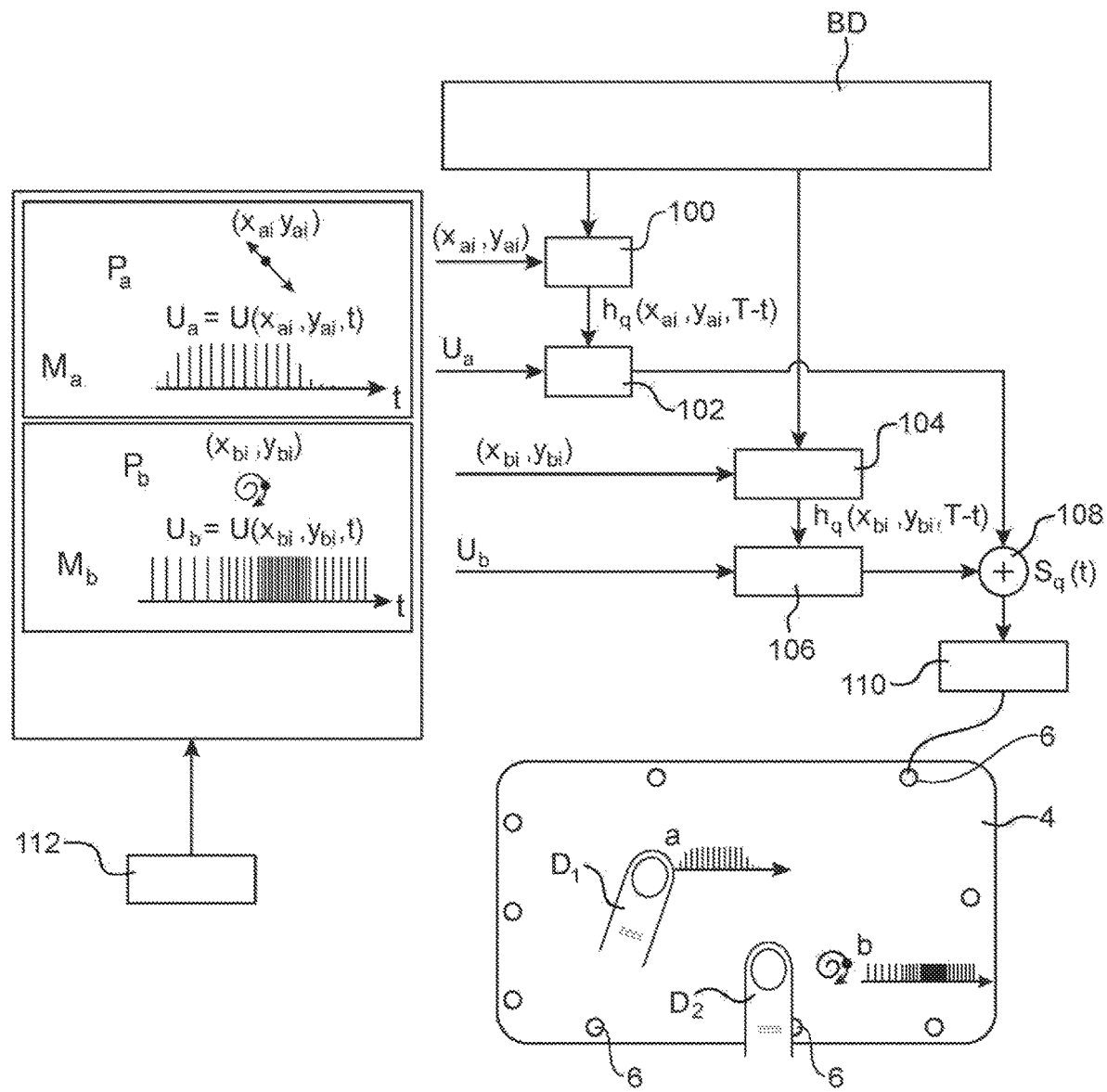
FIG. 4 is a schematic description of an exemplary method for controlling a tactile stimulation interface according to the invention.

In the present application, it is considered, for the sake of simplicity, that the tactile surface is intended to be touched by the pad of a finger D or of several fingers. However the surface of the interface according to the invention is able to apply a stimulation to any of the part of the user's body sensitive to the sense of touch.

Furthermore, in the present application, by "tactile pattern" or "tactile feedback", it is meant a set of movements generated in a stimulation area of the surface of the interface resulting from the activation of the actuators, felt by the part(s) of the body in contact with the surface, in order to reproduce a sensation such as a button which is pressed, a texture, a click . . . .

By "focusing point", it is meant the point where the acoustic waves are focalised and which is the seat of a high amplitude movement of the surface, and by "stimulation area" the area where it is desired to generate the tactile pattern by successively generating several focusing points to reproduce a same haptic pattern.

FIGS. 1A to 1C show a first exemplary embodiment of a tactile interface according to the invention.

The tactile interface 1 includes a frame 2, an element 3 fitted with a surface 4 held on the frame 2, and on which for example one or several fingers can come in contact, and actuators 6 fixed to the element 3 and able to apply a mechanical stress to the surface 4, the stress being transversally oriented with respect to the surface. The suspended part of the surface 4 forms a surface intended to be tactilely explored.

In the represented example, the element 3 is as a plate.

The frame forms a rigid support for the plate 3. Advantageously, a damping material 9 is interposed between the plate 3 and the frame. Advantageously, the damping material 9 is an adhesive foam, which in addition to attenuating vibrations in the plate 3 keeps the plate 3 on the frame.

The actuators 6 are fixed, for example by gluing on the face 11 of the element 3 opposite to the surface 4. In the represented example, the actuators are mounted along the edges of the plate. In another example, the actuators can be disposed at any point of the element 3. Furthermore, the actuators could be on the touch surface 4.

The surface 4 is intended to be the seat of bending waves or transverse waves generated by the stresses applied by the actuators. According to the invention, the bending waves are focused so as to produce a tactile stimulation at the focusing point.

The element 3 carrying the surface 4 is for example a transparent or non-transparent rigid substrate. The substrate can be planar or curved. The substrate can include one or several materials. Furthermore, it can have a thickness between 0.1 mm and 5 mm.

For example, the element 3 bearing the surface 4 is for example a transparent plate made of glass, polycarbonate, PMMA, or a non-transparent plate made of metal, ceramic, plastic or other.

The implementation of a transparent substrate enables for example the interface to be adapted to a screen, for example to the screen of a pad.

In the represented example, the actuators are piezoelectric actuators. They include a piezoelectric material and two electrodes on either side of the piezoelectric material enabling a potential difference to be applied thereto. The application of a potential difference across the piezoelectric actuator produces at the surface of the plate strains tangents to the plate. This strain curves the surface of the plate. That results in a movement in the direction perpendicular to the plane of the surface.

As a variant, the actuators can be electromagnetical actuators. In this case a strain perpendicular to the plane of the surface is produced by the action of an electromagnetical field on a magnet. The magnet or the coil is attached to the surface.

In the represented example, the interface includes thirty-two actuators, however this number is not limiting. For example 1, 10 or several tens of actuators, for example 40, can be provided, distributed on the support.

The interface also includes a control unit UC intended to generate signals to the actuators so that they apply strains to the surface, so as to generate bending waves at a given focusing point.

The strains applied by the actuators 6 to the surface 4 are calculated by a time reversal method, which enables the actuators to generate waves interfering in a constructive way at one or several given point(s) of the surface and at a given time. The user does not feels the waves propagating in the plate but feels the pulse produced at the point(s) and at the given time due to the constructive interference. The gain of the actuators is set so that the amplitude everywhere else, outside the focusing point, is such that the vibration is not perceived. The contrast, which refers to the ratio between the amplitude at the focusing point and the mean square amplitude at any other point is therefore a critical magnitude which should be maximised to produce a stimulation clearly perceived at the focusing point without creating a stimulus at any other point. In the presented example, the contrast for a single focusing is C=43 and the amplitude at the focusing point reaches a=14 µm.

The adhesive foam present in the example is used, on the one hand to hold the plate on its support and on the other hand to attenuate the vibrations thereof. This attenuation enables the attenuation constant τ to be decreased and therefore the focusing repetition period $T_\tau$ to be reduced without affecting the contrast of repeated focusing $\hat{C}$, in accordance to the expression given below. This attenuation can also be adjusted by an appropriate choice of material for the plate or by adding a film to its surface.

Advantageously, sensors detecting the presence of the user's fingers on the interface can also be implemented, which enables a tactile stimulation to be only generated in the areas being explored by the fingers. The electric consumption of the interface can then be decreased, which is particularly interesting in the case of tactile stimulation interfaces applied to portable apparatuses. They can be for example optic or capacitive sensors.

Detecting the position of the finger is for example obtained by capacitive means, the plate carrying the surface forming one of the plates of a variable capacitor and the pad of the finger forming the other plate. Furthermore it is possible to follow the movement of the fingers.

A device capable of measuring the value of the interaction force exerted locally or on the whole interface can also be added, in order to link the pulses produced by focusing to the strains exerted by the finger(s) in contact with the plate.

The principle of the time reversal focusing will now be briefly described.

The principle of the time reversal of the waves is based on the invariance of the wave propagation equation by time reversal and on the reciprocity principle.

Let $h(x_\alpha|x_q, y_\alpha|y_q, t)$ the out-of-plane movement of the surface registered during time t at a point of coordinates $(x_\alpha, y_\alpha)$ after a pulse signal has been emitted by an actuator at $(x_q, y_q)$. The pulse response between points α and q is called $h(x_\alpha|x_q y_\alpha|y_q, t)$.

Considering that the response of the plate and actuator system is linear, if the actuator located at q no longer emits a pulse but emits a signal $s_q(t)$, the movement to the point α is then given by: $u(x_\alpha, y_\alpha, t) = h(x_\alpha|x_q, y_\alpha|y_q, t) \otimes s_q(t)$ with $\otimes$ being the convolution operator.

Thus, if the actuator located at q no longer emits a pulse but emits the time reversed pulse response from instant T until the initial instant t=0, let $$s_q(t) = h(x_\alpha|x_q, y_\alpha|y_q, T-t) \text{ with } 0<t<T,$$

the movement produced in any point b will be:

$$\begin{aligned} u(x_b, y_b, t) &= h(x_b | x_q, y_b | y_q, t) \otimes s_q(t) = \\ &\quad h(x_b | x_q, y_b | y_q, t) \otimes \\ &\quad h(x_a | x_q, y_a | y_q, T-t) \\ &= \int_0^t h(x_b | x_q, y_b | y_q, t-\xi) \\ &\quad h(x_a | x_q, y_a | y_q, T-\xi)d\xi \end{aligned}$$

The movement is thus the result of the integral of the product of two functions which are not a priori correlated, the result of which has therefore a zero average. There is at a point b and at any instant t a movement with a zero average which forms a basic vibration present on the whole plate. On the contrary, at the instant t=T corresponding to the end of the emission phase by the actuator, a movement at the point α is obtained:

$$u(x_\alpha, y_\alpha, T) = \int_0^T h(x_\alpha|x_q, y_\alpha|y_q, T-\xi)^2 d\xi.$$

This time a strictly positive quantity is integrated. The result is a high amplitude non-zero movement. This movement is only obtained at the point α and at the instant T, hence the wave focusing in space and in time.

In the case where Q actuators are used, their contributions add to give:

$$u(x, y, t) = \Sigma_{\alpha=1}^Q u_q(x, y, t).$$

The contrast is defined as the ratio between the movement at the focusing point at the instant T and the standard deviation of this movement at any point b. It is obtained by the relationship:

$$C = \sqrt{BT_c} \sqrt{\frac{Q\tau\left(1-e^{-\frac{2T}{\tau}}\right)}{(Q+1)\tau\left(1-e^{-\frac{2T}{\tau}}\right)+T_c}}$$

with Q being the number of actuators, T the duration of the reversal window, τ the attenuation time constant of the vibrations in the plate and $T_c$ the characteristic time of the plate or modal density of the plate in seconds, or normal mode per Hz and $B = f_{max} - f_{min}$ the bandwidth, in hertz of the signals emitted by the actuators.

Since the focusing is repeated in time with a period $T_\tau$, the contrast is affected according to the relationship:

$$\hat{C} = C\sqrt{1 - e^{-\frac{2T_r}{\tau}}}.$$

To preserve the contrast, the successive focusings are repeated with a period $T_\tau \geq \tau$.

The medium frequency of the signals defines the maximum resolution which can be reached by the relationship:

$$R_s = \sqrt[4]{\frac{D}{\rho_s}}\sqrt{\frac{8}{2\pi f_m}}$$

with $R_s$ being the spatial resolution, or full width at half maximum of the focusing point, $$f_m = \frac{f_{max} + f_{min}}{2}$$

the medium frequency of the emitted signals, D the stiffness in flexure and $\rho_s$ the weight per unit area of the plate. The pulse responses h(t) can be obtained, either experimentally and by effectively registering the pulse responses, or by simulation, or analytically when the geometry remains simple.

Then, a database of the reversed pulse responses at different points of the surface is made, this database is used to generate the signals sent to the actuators. It can be any points of the surface or according to a very tight meshing, in order to ensure a high resolution in the stimulation. As a variant and particularly advantageously, a database of the pulse responses at a number of given points of the surface is made, for example distributed as a mesh or on an edge of the surface and the pulse responses between the points of the mesh are determined, for example by interpolation, which thus enables a pulse response to be determined at any point of the surface, and the time for making the database and its size to be reduced. The interpolation can be made according to the different methods, for example it can be a Fourier interpolation, the Compressed Sensing method, the fundamental solution methods, or a method based on a variational form of the propagation equation.

The duration of the movements of the surface is variable, for example in the order of 10 ms to 100 ms, according to the pattern to be reproduced and the desired contrast, and the strains can be repeated at a desired frequency and amplitude. The obtained contrast and amplitude at the focusing point depend on the dimension of the interface, on the damping of vibrations and on the number of actuators. The number of actuators can be chosen as a function of the interface.

According to the invention, for a same tactile pattern, also referred to as "stimulation event", it is provided to spatially modulate the focusing point, i.e. to move the focusing point in the stimulation area. In the state of the art in order to obtain a haptic pattern, the actuator(s) are controlled to induce a movement of the surface at a single point of the surface, and this movement can be repeated over time. According to the invention, the movement of the surface successively occurs at different points of the surface which are located in the stimulation area in contact with the pad of the finger. For example, in FIG. 2, a finger can be seen on a surface and the different locations of the focusing point $PF_i$ can be seen in transparency, the index i corresponding to the occurrence order of the movement of the location during the stimulation event.

For example, the pad of the finger is in contact with the surface having a surface area of 1 cm², this area corresponding to the stimulation area, and the focusing point is successively moved in the 1 cm² stimulation area. For example, the distance between two successive locations of the focusing point is in the order of 0.1 mm to 1 mm. The inventors have determined that the size of each focusing point truly felt by the user was between 0.1 mm and 2 mm, which is substantially lower than the size of the focusing spot which is moved by focusing constructive waves. That is for example confirmed by document G. Von Bekesy, "*Similarities between hearing and skin sensations,*" Psychological review, vol. 66, no. 1, pp. 1-22, Jan. 1959 which shows that a spatially extended movement but of a short duration is perceived as being occasional. Thus, by moving the point where the waves are focused, the stimulated area of the pad of the finger is larger than that of a single fixed focusing point, which improves the perception and which enables complex patterns to be generated and therefore the communication to be enhanced. Moving the focusing point results in exciting more mechanoreceptors and in producing a more intense stimulus.

The relative disposition of the focusing points can be variable. For example, this disposition can correspond to a circle, a spiral, a triangle, a square, a hexagon, a straight or curved line . . . . It is to be noted that, according to the invention, the user cannot distinguish this shape, but the latter is chosen to enrich the stimulation.

This modulation of the location of the focusing point enables the range of the tactile sensations felt by the user to be substantially enhanced.

FIG. 4 shows a schematic description of the method for generating signals to actuators of a tactile interface according to the invention.

In the represented example, the control unit simultaneously generates stimulation areas a and b for two fingers D1 and D2.

It is desired to generate a first tactile pattern in the area a and a second tactile pattern in the area b. According to the invention, for at least one pattern several focusing points are associated in each stimulation area. It will be understood that the interface can include patterns including several focusing points.

Each area includes a map for generating Pa, Pb the focusing points. For the area a, the focusing points are designated PFai, and for the area b, the focusing points are designated PFbi, i designating the generation order of the point. For the area a, the focusing points will be distributed on a straight line and for the area b, the focusing points will be distributed on a spiral. Any other distribution can be considered. As explained above, the user is not able to feel the distribution type of points, he/she only feels a tactile stimulation.

In an exemplary embodiment, the distribution of the focusing points can vary in a same area over time.

The location of each focusing point is determined by its coordinates in the reference system (x, y) designated (xai, yai) and (xbi, ybi).

Each pattern is defined by a movement amplitude of the surface at each focusing point and by a repeating frequency of the focusing points, and the frequency and amplitude can be constant or variable.

In the represented example, the pattern in the area a is defined by the function Ua(xai, yai, t) and the pattern in the area b is defined by the function Ub(xbi, ybi, t).

In the example shown in FIG. 4, the pattern in the area a has an amplitude variation with a constant frequency and the pattern in the area b has a constant amplitude with a variable frequency.

It will be understood that the patterns can be of any type and for example have a variable amplitude with a variable frequency. Furthermore, the characteristics of the pattern can be modified as a function of other parameters such as the force exerted by the finger on the surface as described below.

In a first step, the contact of the finger(s) with the surface can be detected, so as to only generate a stimulation when the fingers are present.

In a following step, the signal to be sent to each actuator is determined.

For the area a and the pattern Ua, it is desired to first excite the point PFa1.

First the reversed pulse response at the point Pfa1 is searched for in the database BD of the reversed pulse responses. Either the response exists, since it has been previously determined, or it is determined by a spatial interpolation as explained above (step 100). This response is designated hq(xai, yai, T-t).

Each pulse response is then convoluted to the time pattern Ua (step 102).

The same steps are performed for the area b at the point PFb1 (steps 104 and 106), the reversed pulse response is convoluted to the pattern Ub.

A signal corresponding to the sum of the signals calculated for each point (step 108) is sent to an actuator. In the case where there are several actuators in the surface, this set of operations is simultaneously performed for each actuator of the surface. Each actuator emits a pulse response which is specific to itself, especially depending on its position in the surface and on the type of actuator.

Very advantageously, a step of amplifying 110 the signal occurs.

The above steps are repeated for all the focusing points PFa2 to PFan and PFb2 to PFbn.

In the represented example, the generation frequencies of the focusing points PFai and PFbi vary over time and are different from each other.

Each area a and b then includes a cloud of focusing points, the focusing points being successively excited.

The excitation duration of each focusing point can vary from one focusing point to the other.

Figure 5:
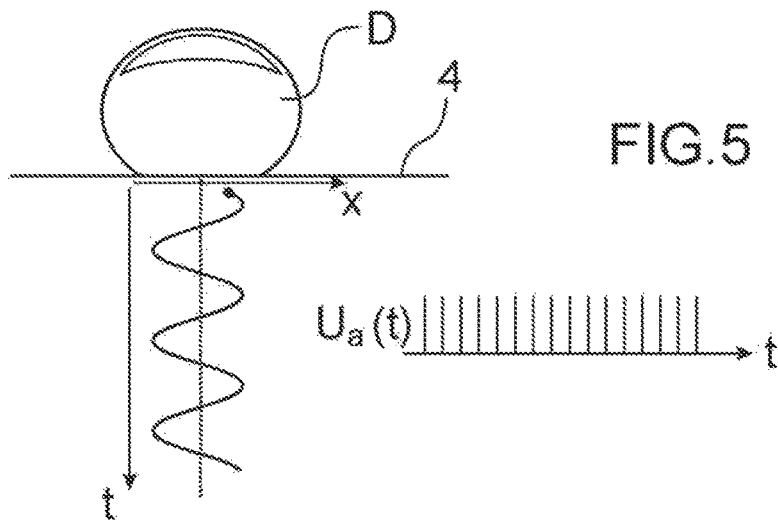
FIG. 5 is a schematic description of an exemplary spatial modulation of the focusing point.

FIG. 5 shows an exemplary spatial and time modulation of a focusing point along the axis X. For example, the successive location of the focusing points PFai can be seen. In this example, the focusing points periodically reappear at the same places. Furthermore the pattern Ua is represented, it has a constant amplitude and a constant focusing point generation frequency.

Figure 6:
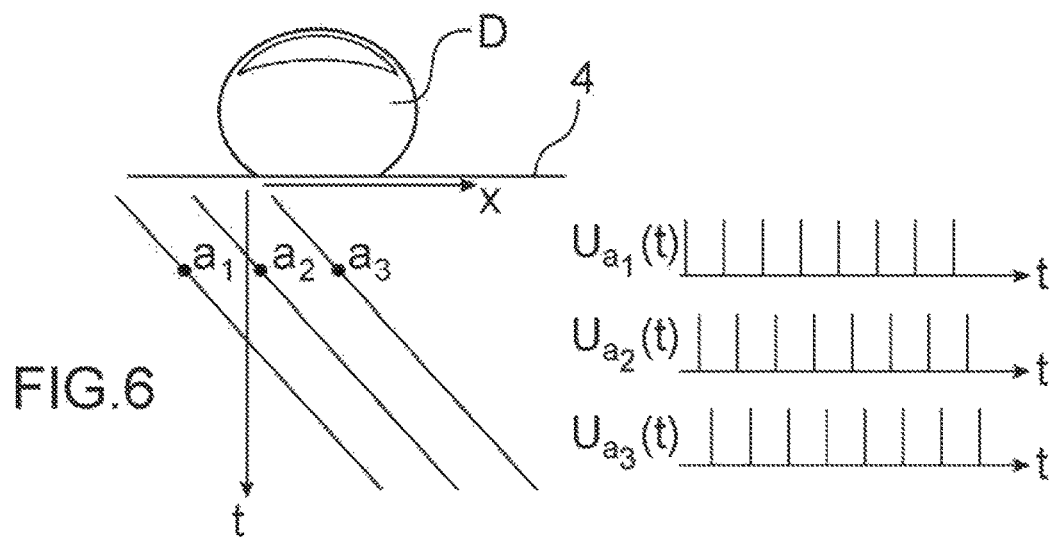
FIG. 6 is a schematic description of another exemplary spatial modulation of the focusing point.

FIG. 6 shows another exemplary spatial and time modulation of the focusing point along the axis X.

In this example, three sliding focusing points a1, a2, a3, which move over time, are considered. The movement of each point over time is linear and only one of the points is activated. Focusing at the point a1 alternates with that at the points a2 and a3. The amplitudes are the same at the points a1, a2, a3. The patterns for each point are designated Ua1, Ua2, Ua3. The felt amplitude is maximum.

As a result, the points pass through the area a.

In the examples of FIGS. 5 and 6, the focusing points are disposed on a line, but they could be disposed in a two-dimension pattern, for example on a circle.

Figure 7:
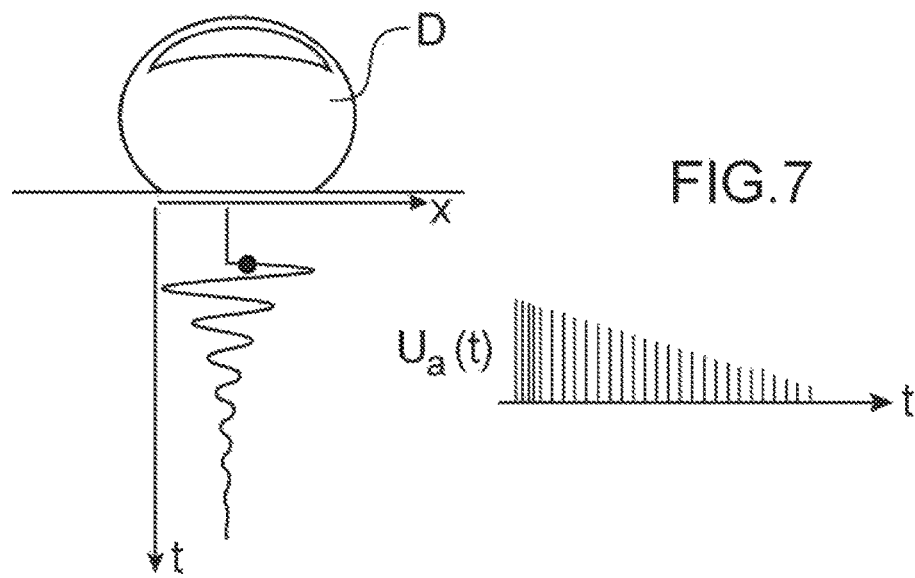
FIG. 7 is a schematic description of another exemplary spatial modulation of the focusing point.

In FIG. 7, the focusing points are generated on a line with an amplitude which evolves. The focusing points could be disposed in a two-dimension pattern, for example on a circle.

FIGS. 3A to 3F show different examples of time modulation of the movement amplitude Amp in μm at the focusing point as a function of time t in ms. For the modulations of FIGS. 3A, 3C, and 3F, the frequency is for example of 200 Hz and for the modulations of FIGS. 3B, 3D and 3F, the frequency is for example of 500 Hz.

In FIGS. 3A and 3B, the time modulations are repetitions of the movement at a same amplitude and at a constant frequency, which corresponds to an aggressive pattern. Among all the movements $PF_i$, at least two occur at different locations.

In FIGS. 3C and 3D, the time modulations are repetitions of the movement at an increasing amplitude and then at a decreasing amplitude, and at a constant frequency, which corresponds to a gradual aggressive pattern. Among all the movements $PF_i$, at least two occur at different locations.

In FIGS. 3E and 3F, the time modulations are repetitions of the movement at a decreasing amplitude and at a same frequency, which corresponds to an aggressive pattern at the beginning, which gradually softens. Among all the movements PFi, at least two occur at different locations.

It will be understood that for each stimulation event, focusing occurs in at least two different focusing points. It can then be considered that, for a stimulation event, 10 focusing points are excited but only two are at different locations.

Also very advantageously, it may be provided to modulate the movement characteristics as a function of the value of the force applied by the user's finger and the position of the finger (step 112). For example, if a focusing is produced each time the exerted strain crosses a threshold, the illusion of pressing against a surface having a certain stiffness is produced. It is this particular method which enables the stiffness sensation to be reproduced. A high pressing force makes it possible to focus on a larger surface.

The interface advantageously includes means for determining the force applied by the user to the surface. For example, a strain sensor integrated in the plate support can be used, which enables the total strain applied to the surface to be measured. To measure the locally exerted strain, a matrix of piezoresistive sensors could for example be used.

Advantageously, the interface can further include one or several sensors. For example, it can be a temperature sensor for the environment in which the interface is. Indeed the temperature can modify the propagation speed of waves in the surface. This temperature information can therefore be used to correct the signals sent to the actuators to take into account this propagation speed modification.

The invention can also be used, very advantageously, to guide the motions of the user. For example, a decrease in the discretised focusing amplitude on a line enables a finger to be guided towards this direction. A low amplitude gives the impression of an easier motion of the finger towards the direction with a decreasing amplitude, which prompts the user to move his/her finger in this direction.

The invention claimed is:

1. A tactile stimulation interface, comprising:
a surface configured to be tactilely explored by at least one user's organ,
at least one actuator configured to apply a strain to said surface, and
at least one controller configured to control said at least one actuator, said at least one controller being configured to send to the actuator signals corresponding to the strains to be applied to said surface as a function of the tactile stimulation to be generated on the surface, said strains being determined by a time reversal method, wherein
for at least one given tactile pattern in a stimulation area of the surface, which is in contact with the user's organ located in a particular position on the surface, the at least one controller is configured to control said at least one actuator so that the actuator generates in the stimulation area of said surface, which is in contact with the user's organ located in the particular position on the surface, pulses by focusing at least one acoustic wave at a point having a location at the surface, the point moving over time from the location within the particular position to another location within the particular position without the user's organ moving, the particular position including a plurality of locations, which include the location and the another location and are positioned in a two-dimensional pattern, so as to tactilely stimulate different locations on said user's organ resting on the stimulation area according to the at least one given tactile pattern, and
the two-dimensional pattern includes a pattern arranged in a circular fashion.

2. The tactile stimulation interface according to claim 1, wherein the stimulation area corresponds to a surface area substantially equal in size to a portion of the user's organ that is in contact with the surface.

3. The tactile stimulation interface according to claim 1, wherein the at least one controller is configured to control said at least one actuator so that the at least one actuator generates in several distinct areas pulses by focusing acoustic waves at points, each having a location at the surface, the respective locations varying over time, so as to tactilely stimulate several organs according to given tactile patterns.

4. The tactile stimulation interface according to claim 1, further comprising: at least one presence detector configured to detect presence of said user's organ, the at least one presence detector being of capacitive type.

5. The tactile stimulation interface according to claim 1, further comprising: at least one force detector configured to detect a contact force between the user's organ and the surface.

6. The tactile stimulation interface according to claim 1, wherein the at least one actuator comprises several actuators.

7. The tactile stimulation interface according to claim 1, wherein the surface is carried by a plate, the at least one actuator being located in contact with the plate at least at an edge of the plate.

8. The tactile stimulation interface according to claim 7, wherein the plate is transparent.

9. A method for controlling a tactile stimulation interface that includes a surface configured to be tactilely explored by at least one user's organ, and at least one actuator configured to apply a strain to said surface, the method comprising:
controlling, by at least one controller, said at least one actuator, said controlling including sending to the actuator signals corresponding to the strains to be applied to said surface as a function of the tactile stimulation to be generated on the surface, said strains being determined by a time reversal method, wherein
for at least one given tactile pattern in a stimulation area of the surface, which is in contact with the user's organ located in a particular position on the surface, the controlling controls said at least one actuator so that the actuator generates in the stimulation area of said surface, which is in contact with the user's organ located in the particular position on the surface, pulses by focusing at least one acoustic wave at a point having a location at the surface, the point moving over time from the location within the particular position to another location within the particular position without the user's organ moving, the particular position including a plurality of locations, which include the location and the another location and are positioned in a two-dimensional pattern,
the two-dimensional pattern includes a pattern arranged in a circular fashion, and
tactilely stimulating the user's organ according to the at least one given tactile pattern in the stimulation area of the surface, including a spatial modulation of the focusing point of the at least one acoustic wave generated by said at least one actuator.

10. A method for controlling a tactile stimulation interface that includes a surface configured to be tactilely explored by at least one user's organ, and at least one actuator configured to apply a strain to said surface, the method comprising:
controlling, by at least one controller, said at least one actuator, said controlling including sending to the actuator signals corresponding to the strains to be applied to said surface as a function of the tactile stimulation to be generated on the surface, said strains being determined by a time reversal method, wherein
for at least one given tactile pattern in a stimulation area of the surface, which is in contact with the user's organ located in a particular position on the surface, the controlling controls said at least one actuator so that the actuator generates in the stimulation area of said surface, which is in contact with the user's organ located in the particular position on the surface, pulses by focusing at least one acoustic wave at a point having a location at the surface, the point moving over time from the location within the particular position to another location within the particular position without the user's organ moving, the particular position including a plurality of locations, which include the location and the another location and are positioned in a two-dimensional pattern, and
tactilely stimulating the user's organ according to the at least one given tactile pattern in the stimulation area of the surface, including a spatial modulation of the focusing point of the at least one acoustic wave generated by said at least one actuator,
wherein the tactilely stimulating further includes:
a) determining a reversed pulse response for a first point of said stimulation area,
b) convoluting said reversed pulse response to said at least one given tactile pattern,
c) generating a signal based on a result of said convolution and sending said signal to said at least one actuator and generating pulses to said first point,
d) repeating steps a), b) and c) for n other points of said stimulation area, n being an integer equal to or greater than 1, at least one point of the n other points being distinct from the first point.

11. The method according to claim 10, wherein the steps a), b), c) and d) are simultaneously performed for the stimulation area and for a second stimulation area distinct from the stimulation area, and during step c) the signal sent to said at least one actuator is a sum of the signal generated for the stimulation area and of the signal generated for the second stimulation area.

12. The method according to claim 10, wherein the generating the signal includes measuring and taking into account a force exerted by the user's organ on the surface.

13. The method according to claim 9, wherein the at least one given tactile pattern has a variable amplitude or a variable pulse generation frequency.

14. The method according to claim 10, wherein, during step a), the reversed pulse response is chosen from a database.

15. The method according to claim 10, wherein, during step a), the reversed pulse response is determined by interpolation between at least two reversed pulse responses chosen from a database.

16. The method according to claim 10, wherein presence of the user's organ is detected prior to step a).

17. The tactile stimulation interface according to claim 1, further comprising: at least one presence detector configured to detect presence of said user's organ, the at least one presence detector comprising a variable capacitor.

18. The tactile stimulation interface according to claim 1, wherein the location and the another location are positioned in the two-dimensional pattern simultaneously.

\* \* \* \* \*